United States Patent [19]
Hogan

[11] Patent Number: 5,523,060
[45] Date of Patent: Jun. 4, 1996

[54] APPARATUS FOR RETORTING MATERIAL

[76] Inventor: Jim S. Hogan, 1742 Country Club Dr., Sugar Land, Tex. 77478

[21] Appl. No.: 407,762

[22] Filed: Mar. 21, 1995

[51] Int. Cl.$^6$ .............................. F27B 7/36; B09B 3/00
[52] U.S. Cl. .................. 422/184.1; 422/194; 422/203; 422/204; 422/209; 422/233; 202/118; 432/111; 432/109
[58] Field of Search .................................. 422/184, 193, 422/194, 202, 203, 204, 209, 232, 233, 307; 202/118, 136; 196/98, 112, 134, 127; 432/106, 107, 109, 111, 112, 113; 110/215, 216

[56] References Cited

U.S. PATENT DOCUMENTS

| | | | |
|---|---|---|---|
| 1,573,824 | 2/1926 | Griffiths | 202/136 |
| 1,927,219 | 9/1933 | Reed et al. | 202/218 |
| 1,927,244 | 9/1933 | Pier et al. | 502/419 |
| 1,944,647 | 1/1934 | Petit | 202/131 |
| 2,872,386 | 2/1959 | Aspegren | 202/136 |
| 3,020,212 | 2/1962 | Lantz | 202/118 |
| 3,639,111 | 2/1972 | Brink et al. | 48/111 |
| 3,691,019 | 9/1972 | Brimhall | 202/118 |
| 3,787,292 | 1/1974 | Keappler | 202/118 |
| 4,140,478 | 2/1979 | Kawakami et al. | 432/13 |
| 4,285,773 | 8/1981 | Taciuk | 202/136 |
| 4,344,821 | 8/1982 | Angelo, III | 202/134 |
| 4,439,209 | 3/1984 | Wilwerding et al. | 48/76 |
| 4,563,246 | 1/1986 | Reed et al. | 422/209 |
| 4,730,564 | 3/1988 | Abboud | 110/246 |
| 4,872,954 | 10/1989 | Hogan | 202/118 |
| 4,925,389 | 5/1990 | DeCicco et al. | 432/111 |
| 5,078,836 | 1/1992 | Hogan | 201/7 |
| 5,207,176 | 5/1993 | Morhard et al. | 110/215 |
| 5,227,026 | 7/1993 | Hogan | 202/117 |
| 5,364,182 | 11/1994 | Hawkins | 432/109 |
| 5,374,403 | 12/1994 | Chang | 422/307 |
| 5,393,501 | 2/1995 | Clawson et al. | 432/111 |

*Primary Examiner*—Robert J. Warden
*Assistant Examiner*—Theresa T. Snider
*Attorney, Agent, or Firm*—Conley, Rose & Tayon

[57] ABSTRACT

An apparatus is disclosed for the separation and extraction of a waste material into a solid, a liquid, and a gas phase utilizing a rotating drum that is sealed from the atmosphere. The exterior of the drum is heated and the waste material flows through the interior of the drum where the liquid components are vaporized and the solids are dried. The drum includes a oxidizing section where the hot dried solids, after the majority of the liquids have been vaporized, are mixed with gas containing oxygen for oxidizing the remaining particles of oxidizable material in the solids. Hot exhaust gases flow through the interior of the drum in a counter current direction of the flow of the solids to maintain an inert atmosphere in the heating section where the vaporization takes place and to prevent the condensables from flowing back over the solids and condensing. The vapors flow through a chamber that contains a hot oil spray for removing solids from the vapors, and then flow to a condenser. A selected portion of the oil spray stream containing solids removed from the vapors is selectively pumped to the cold end of the drum for removing the solids from the oil by vaporizing the oil or pumped to an internal drum on the hot end of the drum for removing the solids from the oil by cracking and/or vaporizing the oil.

12 Claims, 1 Drawing Sheet

APPARATUS FOR RETORTING MATERIAL

FIELD OF THE INVENTION

This invention relates to the field of rotating kilns or retorts used for the treatment or processing of material such as solid waste or other solid-containing material requiring thermal treatment, or drying, and more particularly to a retort utilizing a burner and a oxidizing mixing section for mixing the hot solid material, after the majority of the liquids have been vaporized, with air or a gas containing oxygen for oxidizing the minute particles of undesirable constituents. In addition, the present invention relates to a method for removing the particulate from the vapors formed in the retort by flowing the vapors through a chamber containing a hot oil spray for removing the solids from the vapors. The solids are removed from the oil by pumping a selected amount of the oil containing solids back to the cold inlet of the retort and passing the solid-containing oil through the heater section to vaporize the oil, allowing the solids to pass out of the heater section with the main solid stream. Alternatively, the solid-containing oil can be returned to the hot outlet of the heating section so that it is cracked into lower-boiling compounds. Hot exhaust gases from the burner can be inserted upstream of the oxidizing mixing section of the retort for preventing the vapors from flowing back to the oxidizing section and the outlet of the retort.

Retorting kilns or retorts are well known in the art. Typically, a waste material is heated in a rotating drum that is heated externally. The drum is sealed such that the vapors can not escape to the atmosphere. The vapors are removed from the drum and recondensed. The solids, from which the undesirable constituents have been removed, are removed separately from the drum.

The components separated from the waste stream are usually a valuable product, so it is desirable to vaporize as much of the liquids in the retort as is economically possible. However, the amount of liquids that vaporizes from the solids depends on the heat absorbed by the waste stream and is in direct relationship with the temperature of the retort and the retention time of the solids in the retort. Hence, it is desirable to maximize both parameters.

In order for the solids to meet environmental regulations specifications for ordinary land disposal, or other specifications for products produced from the waste, even minute particles of some chemicals must be removed from the solids. Since the temperature required to remove these chemicals is so high, and the retention time so long, it is uneconomical to remove these chemicals with higher heat and longer retention time. Also, the solids product may contain certain compounds in sufficient quantities to react in the presence of oxygen and therefore create a chemically active waste. Hence, after the majority of the liquids in the waste have been vaporized and removed, it is desirable to oxidize the remainder of these chemicals in the controlled environment of the retort, so that they can be removed from the waste stream prior to its disposal.

Incinerators, in contrast, operate at much higher temperatures so as to incinerate, or burn, virtually all of the compounds in the feed stream. This is disadvantageous for two reasons. First, because none of the fed stream is recovered, resulting in the loss of valuable material, and second, because much larger quantities of combustion by-products are released to the atmosphere.

The solids from the retort are at a very high temperature, so it is desirable to cool the solids, after the solids heating section, in order to have a colder seal on the drum. It is therefore necessary to flow an inert vapor, such as nitrogen or steam, through the drum to prevent the back flow of the vapors to the cooling solids. In addition, it is desirable to carry the vapor stream in a flow direction counter to that of the solids, so that the vapors can be effectively separated from the solids.

The present invention includes a drum for heating waste materials so as to vaporize the liquid component of the waste stream. It is therefore an object of the present invention to provide a means for recovering the liquid component of the stream once it has been separated from the solid component. It is a further object of this invention to provide a means for ensuring that the solid stream exiting the system contains no volatile or combustible compounds.

Since the dry solid material is usually ground to a fine power, some of the fine particulates are entrained and carried out with the vapors. This solid material which is carried out with the vapors can cause problems by fouling the piping, condensers, and contaminating the liquids that are recovered from the vapor stream. It is therefore desirable to provide a method for removing the solids from the vapors with an oil spray and removing the solids from the oil such that the oil can be recovered and recirculated through the system.

SUMMARY OF THE INVENTION

It is an object of the present invention to add an oxidizing section to the hot end of the retort for removing such minute particles of hydrocarbon and combustible compounds in the solids by oxidation, and/or reacting any reactive constituents in the solids in a controlled manner, therefore making the solids safe to handle.

It is also an object of the present invention to avoid cooling the solids in the heating section with a cold purge gas. The present invention provides for the use of hot exhaust gases from the retort burner, instead of nitrogen, steam, or other inert gas, to maintain an inert atmosphere in the vaporization zone of the retort, to prevent the back flow of condensable gases in the retort, and to add additional heat to the waste material to assist in vaporization of the liquids.

It is an additional object of the present invention to remove the solids from the retort vapors, immediately after the vapors leave the retort, by flowing the vapors through a chamber containing a hot oil spray for wetting the solids and removing the solids with the hot oil. This allows for the recovery of condensed vapors that are virtually free of minute particulates.

According to the present invention, the solids are removed from the hot oil by passing the solid-containing oil through a cyclone in order to concentrate the solids in a portion of the oil stream. This portion of the oil stream, containing the particulate solids, is either returned to the inlet of the retort for vaporizing the oil and allowing the particulate solids to be recombined with the solid component of the waste stream, or by flowing a selected quantity of the solid-containing oil to an internal drum on the hot end of the retort for cracking the oil. If the oil is passed through the internal drum and cracked, the solids still return to the solid component of the waste stream, while the oil is cracked into lower boiling compounds.

Other objects and advantages of the invention will become apparent from the following description.

The present invention includes a retort for treating waste material comprising one or more rotating drums and one or more free rotating helical or spiral elements that advance the material in the drum or drums from the inlet to the outlet of the retort. The freely rotating helices help clean the drum and also advance the material through the drum. The present invention also includes a plurality of carriers that serve to pulverize the material and prevent it from sticking to the drum and clogging it. The use of a carrier helps to maintain efficient heat in the transfer system.

The exterior of the drum is heated in order to vaporize the bulk of the vaporizable compounds that are present in the feed stream. The inlet and outlet of the drum are sealed to prevent the vapors from escaping from the inside of the drum to the atmosphere.

The material flows from the inlet of the drum and through the heating section of the drum, where the liquids are vaporized. After removal of the liquids from the material, the hot dry solids then flow through a mixing section of the drum where they contact an oxygen stream, which oxidizes the remaining undesirable chemicals in the solids. The processed solids then flow through a cooling section of the drum and out a lock valve to a collection means.

Hot burner exhaust gases are injected between the mixing chamber and the heating chamber for preventing the back flow of condensed vapors from the heating chamber to the oxidizing mixing chamber.

The vapors flow from the heating section of the drum, and immediately enter a spray chamber that includes a hot oil spray for wetting and removing solids carried over with the vapors. After removal of the solids from the vapors, the vapors flow to a condenser and water-oil separator for collection.

Oil is collected in the bottom of the spray chamber and pumped back to the spray. Since the oil soon becomes laden heavily with solids, a side stream of the oil is pumped back to the feed end of the retort for removing the solids from the oil by vaporizing the oil. Some material being processed contains an substantial quantity of large hydrocarbon molecules and an excessive amount of liquids collect in the bottom of the spray chamber. When the build-up of oil in the bottom of the spray chamber is too great, a selected quantity of this oil is pumped to a selected section of the hot end of the retort where these large molecules are exposed to a very hot temperature and removed by cracking.

BRIEF DESCRIPTION OF FIG. 1

For a detailed description of the preferred embodiment, reference is made to the Figure, which schematically shows the preferred embodiment.

DESCRIPTION OF THE DRAWING AND PREFERRED EMBODIMENT

Apparatus

As shown in FIG. 1, the present invention comprises a heat exchanger 100 comprising a rotatable drum 152 that includes a material feed section 110, a heating section 150 and an oxidizing section 200. Heating section 110 comprises a feed conveyor 112 that includes a screw conveyor 114 and a coaxial internal hollow shaft 116. A driver 118 drives material screw conveyor 114. Material is fed into feed conveyor 112 through feed chute 113 and is conveyed to the right, as shown in the Figure, by screw conveyor 114.

Feed conveyor 112 empties into heating section 150 of rotatable drum 152. The middle portion of drum 152 includes a coaxial internal drum 154. Between drums 152 and 154 is positioned a freely rotating helix 156, which is adapted to drive material to the right as shown in the Figure. Inside drum 154 is positioned a second freely rotating helix 158, which is adapted to drive material inside drum 154 to the left as shown in the Figure. A plurality of carriers 160 are located in drums 152 and 154. The carriers are advanced to the right through drum 152 by helix 156, are lifted into the right end of internal drum 154 by a carrier scoop (not shown), and are advanced to the left end of drum 154 by helix 158, whereupon they fall back into drums 152. Thus, the carders remain in drum 152. Helices and carriers of this sort have been used in practice for some time and are more fully described in U.S. Pat. Nos. 5,227,026 and 5,078,836.

Adjacent the right end of drum 154 is oxidizing section 200. Oxidizing section 200 comprises a portion of drum 152 into which oxygen is fed through oxygen feed line 204. The gas in oxygen feed line 204 may be pure oxygen or some other gas containing a high proportion of oxygen. Gas flow through line 204 is controlled by valve 202.

The right end of drum 152 empties into a chamber 160. A seal 162 between drum 152 and chamber 160 prevents communication with the atmosphere. The bottom of chamber 160 feeds through an air lock 164 and into a solid storage unit 170.

The middle portion of drum 152 including heating section 150 is surrounded by heater 220. Heater 220 comprises a burner 222, a gas duct 224, a heating duct 225, a hot bulkhead 226, a cool bulkhead 228, and a recirculating duct 230. Gases are burned at burner 222, resulting in production of hot exhaust gases which pass through duct 224 and into heating duct 225. In heating duct 225, heat is exchanged with drum 152 and the contents thereof. A plurality of seals 227 seals the interface between heating duct 225 and drum 152. If desired, a portion of the hot exhaust gases can be withdrawn through hot bulkhead 226 by means of lines 234, controlled by valve 236. After passing through heating duct 225, the exhaust gases may be withdrawn through cool bulkhead 228 or recirculated through recirculating duct 230. Recirculation of the exhaust gases is aided by a recirculation blower 232 adjacent burner 222. Cool bulkhead 228 feeds to a pair of exhaust stacks 238–240. The flow of exhaust gases through exhaust stacks 238, 240 is controlled by dampers 239, 241, respectively. A gas flow line 250 connects stack 238 to gas line 234, to form exhaust recycle line 253, which feeds into drum 152. The flow of gas through line 250 is controlled by valve 252.

As shown in the Figure, the left end of drum 152 opens into an oil spray chamber 300. Oil spray chamber 300 is part of an oil system that further comprises cyclone 320, oil feed line 340, oil reinjection line 350 and oil spray line 360. Oil spray chamber 300 preferably operates at 350° to 400° F. It has been found that oil at this temperature achieves optimal solids removal. Water does not remove solids as well as oil in the spray application, as it tends to vaporize on contact with the hot vapors entering chamber 300. Oil spray chamber 300 is important to the operation of the whole system. The equipment downstream of drum 152 would quickly become fouled if solid particles were allowed to remain entrained with the vapor stream.

Liquid oil that collects in the bottom of spray chamber 300 is pumped by pump 302 through line 304 into cyclone 320. Line 304 feeds tangentially into cyclone 320. The top of cyclone 320 feeds via line 322 into oil spray line 360. Flow may either be directly from line 322 into spray line 360, or may pass through a heat exchanger 324 in stack 240. Flow between line 322, heat exchanger 324 and spray line 360 is controlled by valves 326, 327 and 328 as shown.

Oil from the bottom of cyclone 320, containing the bulk of the solids removed in chamber 300, flows either into oil feed line 340, which deposits the oil at the hot end of internal drum 154, or into oil reinjection line 350, which deposits the oil in hollow shaft 116 of feed conveyor 112. The flow of oil from cyclone 320 into oil feed line 340 and oil reinjection line 350 is controlled by valves 342, 352, respectively.

Also connected to oil spray chamber 300 is a gas condensing unit 400. Gas condensing unit 400 comprises vapor flow line 402, condenser 420, separator 440, and gas outflow line 450. Vapors removed from oil spray chamber 300 pass through condenser 420 and into separator 440, where oil- and water-based components of the condensed vapor stream are separated. The oil component of the stream exits separator 440 through line 442, while water is removed from the system through line 444. The portion of the stream that does not condense in condenser 420 passes through the top of separator 440 and is removed through gas outflow line 450. A pump 452 creates a pressure drop that serves to draw the gases through separator 440. Exhaust gas line 450 may either be vented to atmosphere, as at 454, or may feed into burner 222. Relative flow between vent 454 and burner 222 is controlled by valves 455, 457, respectively.

Operation

In operation, waste materials, such as tank bottoms, are fed into feed chute 113 and are conveyed by material feed conveyor 112 into drum 152. The feed stream is advanced to the fight by helix 156 and enters the heating section 150, where it is heated by contact with the hot gases in heating duct 225. The temperature in heating section 150 is approximately 500° to 1800 ° F., depending on the materials in the feed stream. This causes most of the hydrocarbons present in the feed stream to vaporize, leaving only the solids, which may be contaminated with minute particles of unvaporized hydrocarbons. This hot, dry solid stream then enters oxidizing section 200, where it is exposed to oxygen. No additional fuel stream is necessary for combustion in oxidizing section 200. A combination of high temperature and oxygen causes the oxidation of any remaining hydrocarbons that may be present. The temperature of the solid stream leaving chamber 200 is in the range of 500° to 2000° F., preferably between 800° and 1000° F. Because the combustion temperature of the contaminants most likely to be present in the feed stream is below the exit temperature of the solid stream, the level of contaminants in the solid stream can be reduced below 5 ppm. Solids cleaned in this manner are free from hydrocarbons and satisfy environmental regulations. The clean solid stream then enters chamber 160 and is fed through air lock 164 into hopper 170.

The vapors produced by passage of the waste stream through heating section 150 are blown to the left as shown in FIG. 1, by exhaust gases fed through stream 253. These exhaust gases maintain an inert atmosphere in the vaporization zone of the retort, prevent the back flow of vapors from the heating section to the oxidizing section and help carry the vapors out of the drum. The hot exhaust gases also convey heat to the material to help vaporize the liquids. The exhaust gases and vaporized hydrocarbons flow from drum 152 into oil spray chamber 300, where they are contacted by a fine mist spray of hot oil through line 360. The hot oil spray serves to remove any solid particulate matter that may be present in the vapor stream. Some of the vapor is condensed as the result of contact with the oil spray and leaves the bottom of oil chamber 300 with the liquid oil stream 304.

The remaining vapors pass through line 402 and into the ambient temperature condenser 420. According to a preferred embodiment, the oxygen content of the vapor stream is monitored and maintained at approximately 2 percent or less by controlling the flow of oxygen gas through oxygen feed line 204. In condenser 420, those compounds having a boiling point above the ambient temperature will re, condense into liquids. As water has a boiling point above the ambient temperature, water present in the vapor stream will also recondense. The hydrocarbon liquids and water that condense from the vapor stream are separated in separator 440. Non-condensable gases, i.e. those having a boiling point below ambient temperature, pass through separator 440 and into gas exhaust line 450.

Depending on the composition of the exhaust gas stream 450, it may be desired to re, circulate those gases into burner 222 for complete combustion of any hydrocarbon vapors that may be present therein. If recirculation is not necessary, it may be desired to vent exhaust gas line 450 to the atmosphere or to a flare. Gases passing through burner 222 are fully combusted and ultimately exit the system through stacks 238, 240.

Liquid oil that collects at the bottom of oil spray chamber 300 contains solids removed from the vapor stream as well as a fraction of liquid hydrocarbons condensed therefrom. This liquid is pumped by pump 302 into cyclone 320, where it is separated by centrifugal action. The lighter fraction, containing relatively few solids, leaves cyclone 320 and is re-used as the oil spray stream 360. If desired, the light oil fraction in line 322 may be passed through a heat exchanger in stack 240 in order to gain heat prior to being sprayed in chamber 300. The heavy oil stream containing most of the solids removed from the vapor stream may either be reinjected into hollow shaft 116 for recombination with the waste stream in drum 152, or may be fed via line 340 into internal drum 154. In the latter instance, the oil enters the hot end of heating section 150 and is cracked into lower boiling compounds. These lower boiling compounds are more likely to vaporize in the drum and become part of the recoverable vapor stream.

While a preferred embodiment of the invention has been shown and described, modifications thereof can be made by one skilled in the art without departing from the spirit of the invention.

What is claimed is:

1. An apparatus for treating solid-containing waste, comprising:

a rotatable drum having first and second ends and a heating section therebetween;

means for feeding a waste stream containing solids and liquids into said first end;

a heater in thermal contact with said heating section for heating said waste stream such that at least some of the liquids in said waste stream are vaporized, leaving solids;

an oxidizing section between said heating section and said second end, for receiving solids from said heating section and contacting said solids with oxygen so as to oxidize any remaining oxidizable material on said solids;

means for removing said solids from said second end of said drum separately from said vapors;

means for removing said vapors from said first end of said drum separately from said solids;

an oil spray chamber in communication with said drum, for receiving said vapors from said drum and contacting said vapors with an oil mist in order to remove solid particulate matter from said vapors, said oil spray chamber further including a collection area for collecting said oil mist as a solid-containing liquid;

a cyclone for separating said solid-containing liquid into substantially solid-free oil and solid-concentrated oil;

first pipe means for returning said substantially solid-free oil to said oil spray chamber for use as oil mist; and second pipe means for returning said solid-concentrated oil to said drum with said waste stream;

third pipe means for alternatively charging said solid-concentrated oil to said heating section such that some of said solid-concentrated oil is cracked into lower-boiling compounds.

2. The apparatus according to claim 1 wherein said heater comprises a burner and a heating duct coaxial with said rotatable drum, said heating section having a hotter end adjacent said burner and a cooler end remote from said burner.

3. The apparatus according to claim 2 further including a condenser in communication with said drum and said burner, for receiving said vapors from said drum, condensing some of said vapors into a recondensed liquid stream, and feeding an uncondensed portion of said vapors to said burner.

4. The apparatus according to claim 2 wherein said means for feeding is coaxial with said rotatable drum.

5. The apparatus according to claim 1 wherein said rotatable drum is sealed to prevent the material inside the drum from coming in contact with the atmosphere.

6. The apparatus according to claim 1 wherein said burner generates hot exhaust gases, further including a gas injection line for injecting a portion of said hot exhaust gases between said heating section and said oxidizing section to prevent back flow of material vaporized in said heating section to said oxidizing section.

7. The apparatus according to claim 1, further including means for maintaining said chamber at a temperature sufficient to prevent water vapor included in said vapors from condensing in said collected oil mist.

8. A apparatus, comprising:

a rotatable drum having first and second ends and a heating section therebetween;

means for feeding a waste stream containing solids and liquids into said first end;

a heater including a heater in thermal contact with said heating section for heating said waste stream such that at least some of the liquids in said waste stream are vaporized, leaving solids;

means for removing said solids from said second end of said drum separately from said vapors;

means for removing said vapors from said first end of said drum separately from said solids; and an oil spray chamber in communication with said drum and including an oil spray head therein, for receiving said vapors from said drum and contacting said vapors with an oil mist in order to remove solid particulate matter from said vapors and collecting said oil mist as a solid-containing liquid, said chamber further including means for maintaining said chamber at a temperature sufficient to prevent water vapor included in said vapors from condensing in said collected oil mist.

9. The apparatus according to claim 8, further comprising a cyclone connected to said oil spray chamber for receiving solid-containing liquid and separating said solid-containing liquid into substantially solid-free oil and solid-concentrated oil.

10. The apparatus according to claim 9, further comprising pipe means connected between said cyclone and said oil spray chamber, for returning said substantially solid-free oil to said oil spray chamber for use as oil mist.

11. The apparatus according to claim 8 wherein said burner generates hot exhaust gases, further including a gas return line for returning a portion of said hot exhaust gases to said drum, to prevent material vaporized in said heating section from flowing from said heating section toward said second end.

12. The apparatus according to claim 8 further including a condenser in communication with said oil spray chamber, for receiving said vapors from said oil spray chamber, condensing some of said vapors into a recondensed liquid stream, and feeding an uncondensed portion of said vapors to said burner.

* * * * *

EX PARTE REEXAMINATION CERTIFICATE (6258th)

United States Patent
Hogan

(10) Number: US 5,523,060 C1
(45) Certificate Issued: Jun. 17, 2008

(54) APPARATUS FOR RETORTING MATERIAL

(76) Inventor: Jim S. Hogan, 1742 Country Club Dr., Sugar Land, TX (US) 77478

Reexamination Request:
No. 90/007,149, Jul. 30, 2004

Reexamination Certificate for:
Patent No.: 5,523,060
Issued: Jun. 4, 1996
Appl. No.: 08/407,762
Filed: Mar. 21, 1995

(51) Int. Cl.
- *B09C 1/00* (2006.01)
- *B09C 1/06* (2006.01)
- *F23G 5/027* (2006.01)
- *B09B 3/00* (2006.01)

(52) U.S. Cl. ............ 422/184.1; 422/194; 422/203; 422/204; 422/209; 422/233; 202/118; 432/111; 432/109

(58) Field of Classification Search ............ None
See application file for complete search history.

(56) References Cited

U.S. PATENT DOCUMENTS

| | | |
|---|---|---|
| 3,674,890 A | 7/1972 | Oleszko |
| 4,260,473 A | 4/1981 | Bauer |
| 4,864,942 A | 9/1989 | Fochtman |
| 4,872,954 A | 10/1989 | Hogan |
| 5,078,836 A | 1/1992 | Hogan |
| 5,227,026 A | 7/1993 | Hogan |

OTHER PUBLICATIONS

Young, G.A., et al., "Elements of Thermally Treating Oil–Base Mud Cuttings," SPE/IADC Drilling Conference, Mar. 1991.

US EPA, "Guide for Conducting Treatability Studies under CERCLA: Thermal Desorption," Sep. 1992.

*Primary Examiner*—Jerry D. Johnson

(57) ABSTRACT

An apparatus is disclosed for the separation and extraction of a waste material into a solid, a liquid, and a gas phase utilizing a rotating drum that is sealed from the atmosphere. The exterior of the drum is heated and the waste material flows through the interior of the drum where the liquid components are vaporized and the solids are dried. The drum includes a oxidizing section where the hot dried solids, after the majority of the liquids have been vaporized, are mixed with gas containing oxygen for oxidizing the remaining particles of oxidizable material in the solids. Hot exhaust gases flow through the interior of the drum in a counter current direction of the flow of the solids to maintain an inert atmosphere in the heating section where the vaporization takes place and to prevent the condensables from flowing back over the solids and condensing. The vapors flow through a chamber that contains a hot oil spray for removing solids from the vapors, and then flow to a condenser. A selected portion of the oil spray stream containing solids removed from the vapors is selectively pumped to the cold end of the drum for removing the solids from the oil by vaporizing the oil or pumped to an internal drum on the hot end of the drum for removing the solids from the oil by cracking and/or vaporizing the oil.

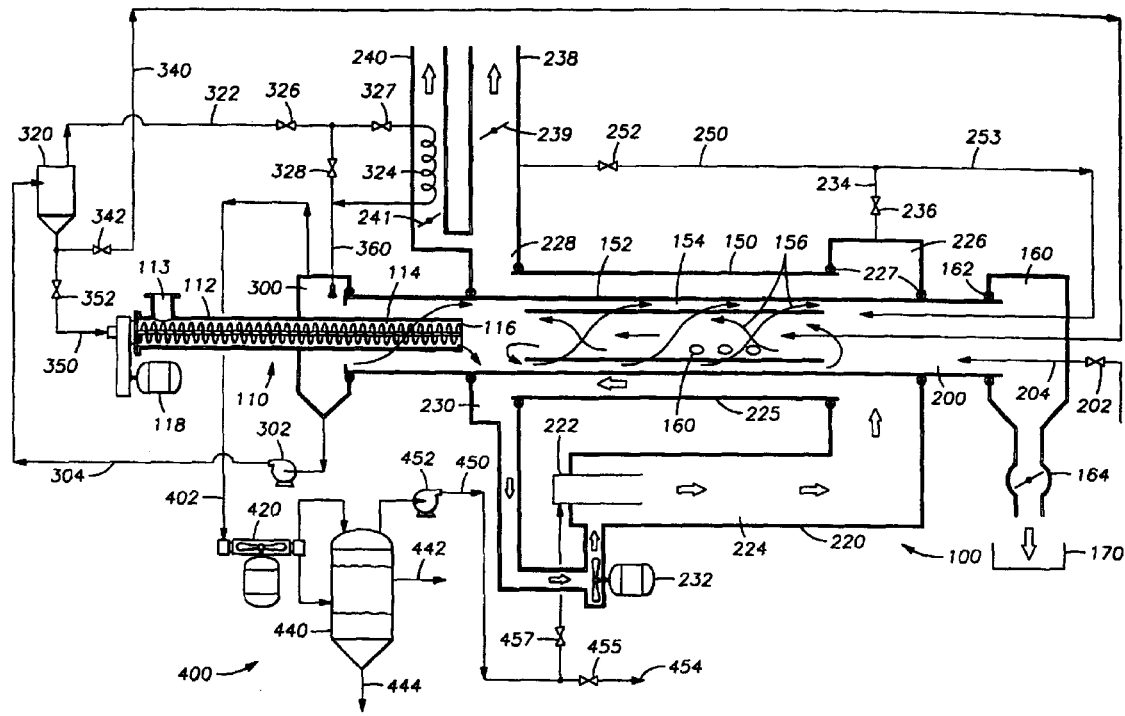

EX PARTE REEXAMINATION CERTIFICATE ISSUED UNDER 35 U.S.C. 307

NO AMENDMENTS HAVE BEEN MADE TO THE PATENT

Figure 1:
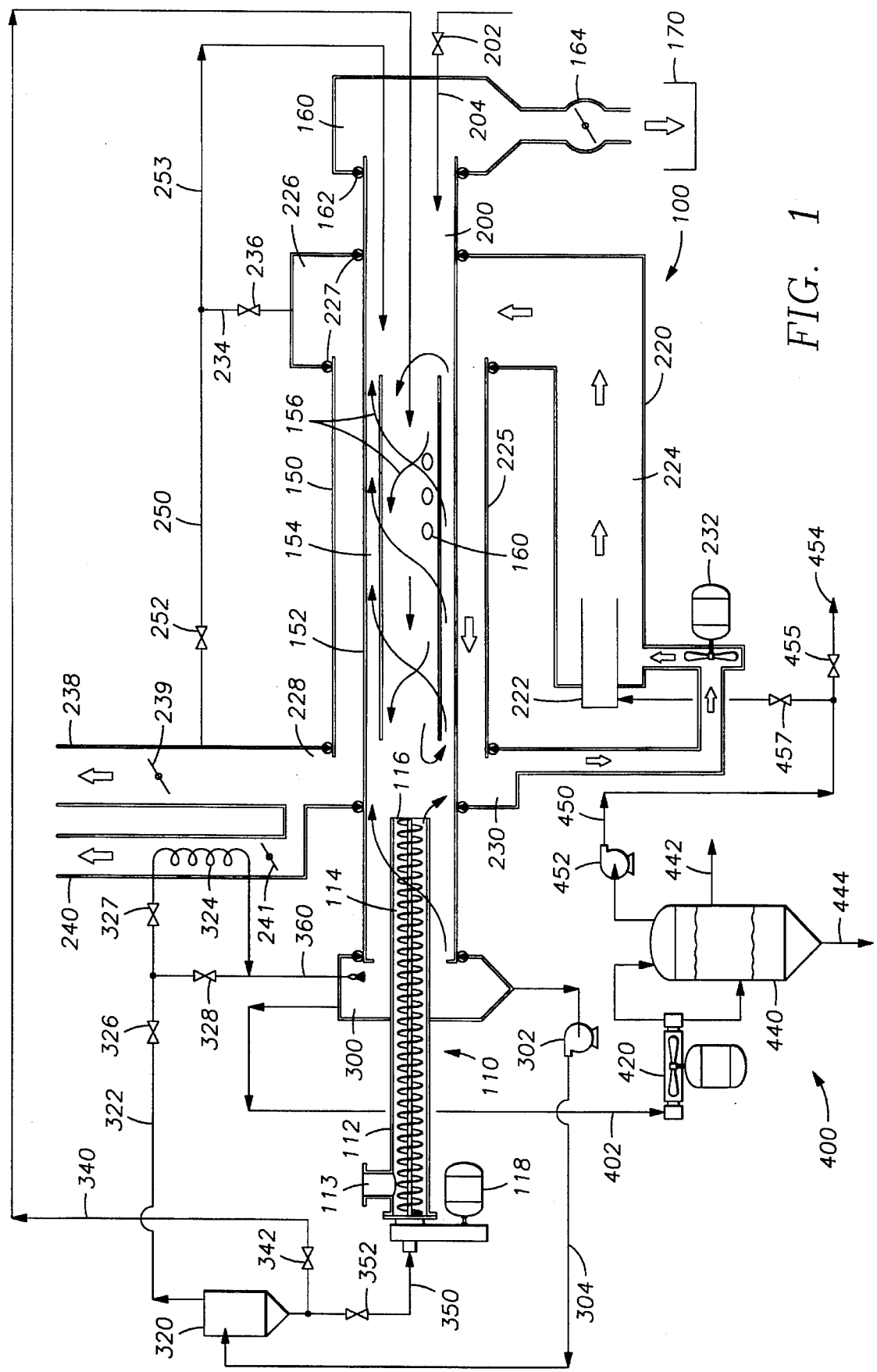

AS A RESULT OF REEXAMINATION, IT HAS BEEN DETERMINED THAT:

The patentability of claims 1–12 is confirmed.

* * * * *